United States Patent [19]
Furuya et al.

[11] Patent Number: 5,392,166
[45] Date of Patent: Feb. 21, 1995

[54] MAGNETIC RECORDING AND REPRODUCING APPARATUS FOR RECORDING AND REPRODUCING TITLE DATA WITH VIDEO AND AUDIO DATA

[75] Inventors: Miki Furuya, Saitama; Sakae Okazaki; Naoki Nagano, both of Tokyo, all of Japan

[73] Assignee: Sony Corporation, Tokyo, Japan

[21] Appl. No.: 20,411

[22] Filed: Feb. 22, 1993

[30] Foreign Application Priority Data

Feb. 26, 1992 [JP] Japan ................................ 4-075146

[51] Int. Cl.$^6$ ................................................ G11B 5/02
[52] U.S. Cl. .................................... 360/19.1; 360/57; 360/14.1; 358/343
[58] Field of Search ................ 360/19.1, 18, 47, 57, 360/48, 14.1; 358/183, 182, 343, 22

[56] References Cited

U.S. PATENT DOCUMENTS

| | | | |
|---|---|---|---|
| 4,575,772 | 3/1986 | Shimada et al. | 360/33.1 X |
| 4,689,022 | 8/1987 | Peers et al. | 434/307 |
| 4,839,745 | 6/1989 | Tindall | 360/38.1 X |
| 4,858,032 | 8/1989 | Okada et al. | 360/10.3 X |
| 4,935,824 | 6/1990 | Nakano | 360/48 |
| 5,124,814 | 6/1992 | Takahashi et al. | 358/335 X |
| 5,132,807 | 7/1992 | Takimoto | 358/335 |

FOREIGN PATENT DOCUMENTS 0196104 10/1986 European Pat. Off. .
0405939 1/1992 European Pat. Off. .

OTHER PUBLICATIONS

Motoyama et al. A Digital Audio Taperecorder (DAT) File Nec Res. & Develop., No. 92 Jan. 1989.
JP14 A-04 037270 (Ricoh Co. Ltd) 7 Feb. 1992 (Constitution and Purpose).
Patent Abstracts of Japan, vol. 014195, Feb. 7, 1990 Hiromiki et al., Information Signal Recorded.

*Primary Examiner*—Andrew L. Sniezek
*Attorney, Agent, or Firm*—William S. Frommer; Alvin Sinderbrand

[57] ABSTRACT

Apparatus and method which records and reproduces title data with video and audio data on oblique tracks on a recording medium. The video and audio data are recorded in video and audio regions, respectively, of the oblique tracks while leaving vacant predetermined title regions in the respective oblique tracks. Title data having title and title control information is recorded in the title regions of the respective tracks. The title, video and audio data are reproduced from the respective tracks on the recording medium, and the title information is combined with the video data in accordance with the title control information to produce a video output signal.

15 Claims, 10 Drawing Sheets

| WD 0 | WD 1 | WD 2 | WD 3 | WD 4 |
|---|---|---|---|---|
| MODE 250 | TITLE DATA | TITLE DATA | TITLE DATA | TITLE DATA |

FIG. 5

| WD 0 | WD 1 | WD 2 | WD 3 | WD 4 |
|---|---|---|---|---|
| MODE 251 = TITLE CONTROL INFORMATION | · ON<br>· OFF<br>· TIME CODE | · ORIGINAL TITLE<br>· SCROLL UP<br>· SCROLL DOWN<br>· WIPE<br>· FADE | COLOR CODE | INVERSE |

TITLE MODES

MAGNETIC RECORDING AND REPRODUCING APPARATUS FOR RECORDING AND REPRODUCING TITLE DATA WITH VIDEO AND AUDIO DATA

The 8-mm video tape recorder is disclosed in U.S. Pat. Nos. 4,551,771 and 4,542,419, and a related arts to this invention is disclosed in U.S. patent application Ser. No. 838,626.

FIELD OF THE INVENTION

This invention relates to a magnetic recording and/or reproducing apparatus suitably applied to 8-mm video tape recorder, for instance. BACKGROUND OF THE INVENTION With the conventional 8-mm video tape recorder (a video tape recorder incorporating with camera), it is possible to record predetermined video signals but also record a title corresponding thereto to be superimposed onto an original image. When in reproducing also, the title is displayed (superimposed) onto the original image. Therefore it is possible to permit enjoyment of richly variable video.

However, when a title is recorded and superimposed onto the video signal, there is the problem that the recorded title can not be erased.

If the title is recorded in the PCM audio data recording regions, it becomes impossible to record a corresponding quantity of PCM audio data.

SUMMARY OF THE INVENTION

In view of the foregoing, an object of this invention is to provide a magnetic recording and reproducing apparatus in which, it seeks to permit recording and erasing of a title as desired while permitting the recording of PCM audio data as well as a video signal at all times.

The foregoing objects and other objects of the invention have been achieved by the provision of a magnetic recording apparatus in which it comprises a rotary head 11 serving as a recording means for recording predetermined signal in obliqued tracks of a magnetic tape 12, a video and AFM circuit 12 serving as video signal supply means for supplying a video signal being a first information signal to the rotary head 11 in a timing corresponding to a first region of the obliqued tracks, a PCM circuit 9 serving as PCM data supply means for supplying PCM data being a second information signal to the rotary head 11 in a timing corresponding to a second region of the obliqued tracks, and a VSC circuit 8 serving as title supply means for supplying title data corresponding to a video signal and a control code to control display of the title being a third information signal to the rotary head 11 in a timing corresponding to a third region between the first and second regions of the obliqued tracks.

Further, a magnetic reproducing apparatus of this invention, comprises a rotary head 11 serving as reproducing means for reproducing a signal recorded in obliqued tracks of a magnetic tape, a video and AFM circuit 13 serving as video signal separation means for extracting the video signal from the reproduced signal output from the rotary head 11 in a timing corresponding to a first region of the obliqued tracks, a PCM circuit 9 serving as PCM data separation means for extracting PCM data from the reproduced signal output from the rotary head 11, a VSC circuit serving as title separation means for extracting title data corresponding to the video signal from the reproduced signal output from the rotary head 11, and a switch 14 serving as synthesizer means for combining the title data separated by the VSC circuit into the video signal separated by said video and AFM circuit 13.

Furthermore, a magnetic reproducing apparatus of this invention, comprises a rotary head 11 serving as reproducing means for reproducing signal a recorded in obliqued tracks of a magnetic tape 12, a video and AFM circuit 13 serving as video signal separation means for extracting the video signal from the reproduced signal output from the rotary head 11, a memory 5 serving as storage means for storing title data corresponding to a video signal, a monitor 15 serving as display means for combining and displaying the title stored in the memory 5 and a video signal separated by the video and AFM circuit 13, and a memory controller 4 serving as control means for controlling the display of the title according to the title control code separated by VSC circuit 8.

In the magnetic recording apparatus of this invention, title data corresponding to a video signal and a control code for controlling the display of the title are stored in the third region between the first and second regions of obliqued tracks. It is thus possible to record the title by recording or after-recording while keeping the original video and PCM audio.

During reproducing, the title and the control code for controlling the display of the title are reproduced from the third region. It is thus possible to permit, as desired, the display of title superimposed onto an original video or the display of solely the original video without any title.

The title display is also controlled according to control code stored in the memory so as to permit richly variable title display.

With the magnetic recording apparatus of this invention, title data and a control code for controlling display of a title are recorded in the third region between the first region for recording a video signal therein and the second region for recording PCM data therein. It is thus possible to record a title on a magnetic tape in a short period of time with a single apparatus. In addition, it is possible to obtain a magnetic tape, which permits richly variable title display, and there is no possibility that the title spoils the original video signal or reduces the PCM data capacity.

Further, title data is reproduced from the region between the region with the video signal recorded therein and the region with the PCM data recorded therein, and the title is combined with the video signal. Thus, it is possible to omit the title display, if necessary. Additionally, the status of display of the title superimposed on the video signal is controlled by the to control code stored in the storage means. It is thus possible to enjoy richly variable title display without damaging the original video signal.

The nature, principle and utility of the invention will become more apparent from the following detailed description when read in conjunction with the accompany drawings in which like parts are designated by like reference numerals or characters.

DETAILED DESCRIPTION OF THE INVENTION

Figure 1:
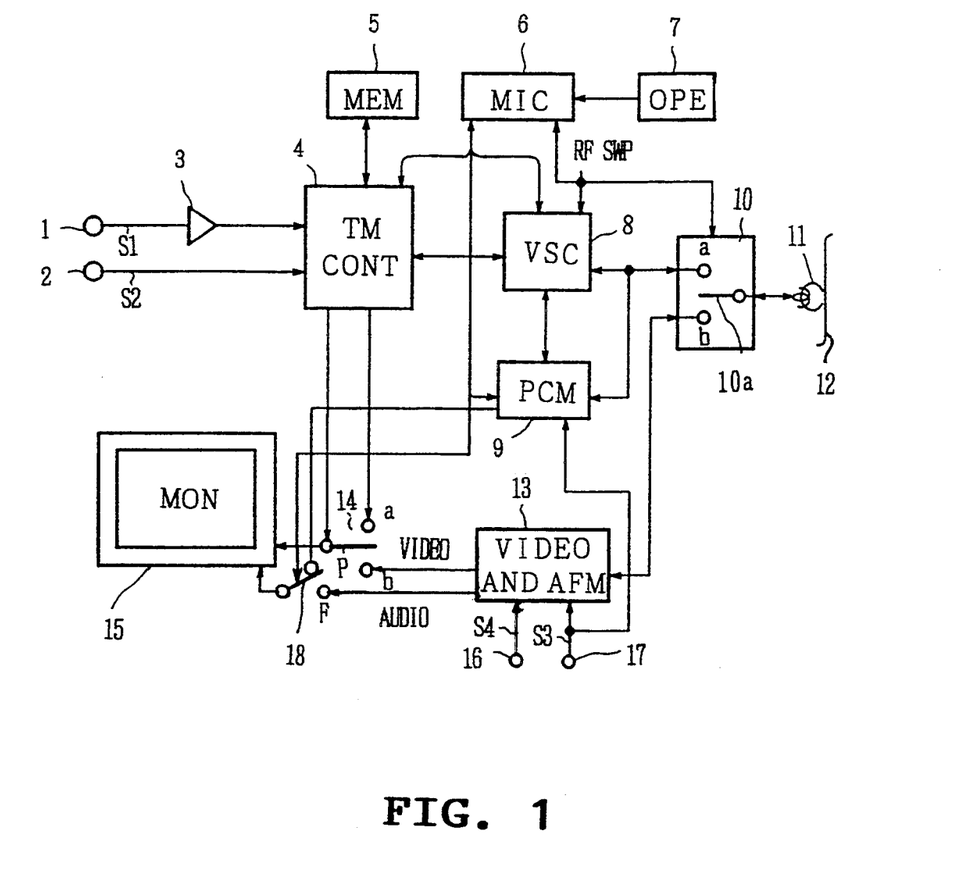
FIG. 1 is a block diagram showing the construction of an embodiment of the magnetic recording and reproducing apparatus according to the invention applied to an 8-mm video tape recorder.

Preferred embodiments of this invention will be described with reference to the accompanying drawings:

FIG. 1 is a block diagram showing the construction of an embodiment of the magnetic recording and reproducing apparatus according to the invention applied to an 8-mm video tape recorder. A luminance signal S1 is input as title to an input terminal 1 from an external circuit (not shown). The luminance signal S1 supplied may represent characters, drawings, etc. manually written on a board using a picture computer (not shown), for instance. A comparator 3 compares the luminance signal supplied to the input terminal 1 to a predetermined reference value and thus binarizes the signal into binary data which is supplied to a title memory controller 4. To the title memory controller 4 are also supplied a horizontal and a vertical sync signals (H and V signals) S2 from an input terminal 2. A memory 5, implemented by the RAM or a ROM, stores a title data. A microcomputer 6 controls various parts of the apparatus according to operations in an operating unit 7 for the execution of recording and reproduction.

Figure 2:
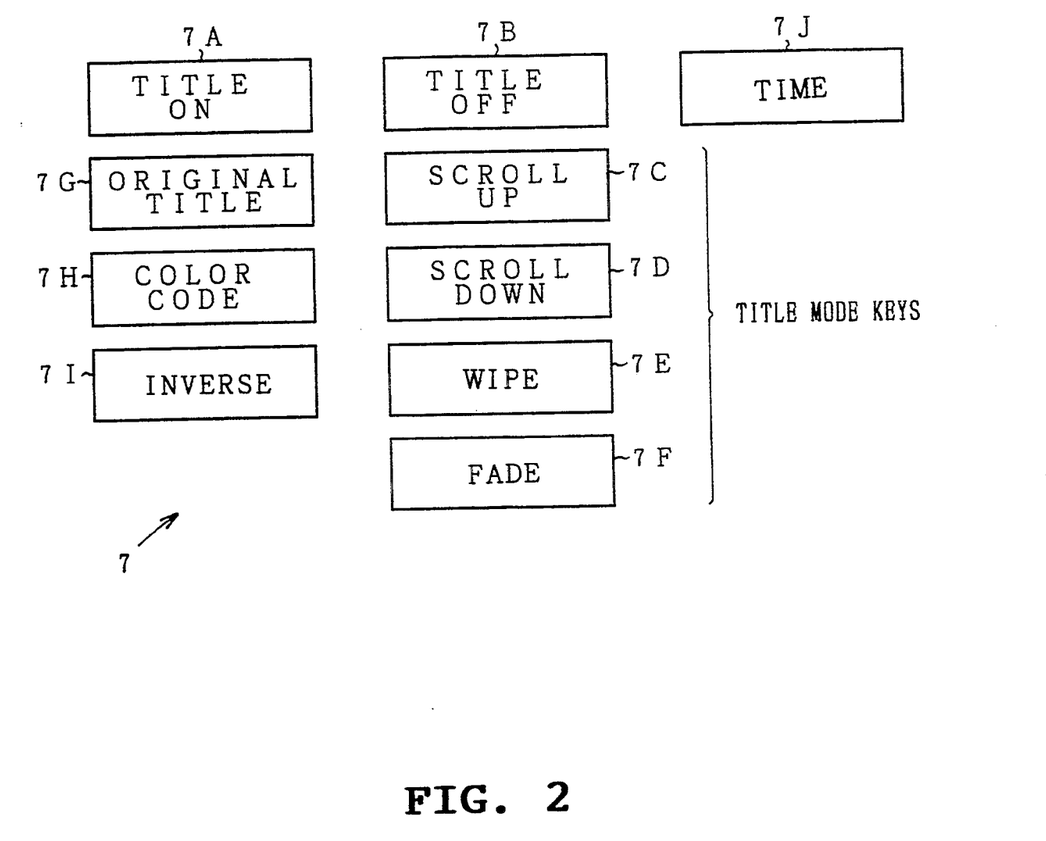
FIG. 2 is a plane view showing an example of a key arrangement of an operating unit 7 in the embodiment shown in FIG. 1.

The operating unit 7, as shown in FIG. 2 for instance, has keys 7A and 7B for recording a code for on-off controlling the display of a title and also title mode keys 7C to 7I for recording various title mode data. The keys 7C and 7D are operated for recording an upward and a downward title scroll control code, respectively. The key 7E is operated for recording a title wipe control code, and the key 7F is operated for recording a title fade-in or fade-out control code. The key 7G is operated for recording a non-processed (or original) title display control code, and the key 7H is operated for recording a control code for providing a predetermined title display color. The key 7I is operated for recording an inverse title display control code. The key 7J is operated for recording title display time information.

A VSC circuit 8 outputs title data and control code supplied from the microcomputer 6 to a recording/reproduction amplifier 10 in a timing corresponding to a VSC region to be described later. In addition, it demodulates a VSC signal supplied from the recording/reproduction amplifier 10 and reads out title and control code to be output to the title memory controller 4. In a recording mode, a PCM circuit 9 PCM processes audio signal S3 supplied from an input terminal 17 and outputs the processed signal to the recording/reproduction amplifier 10 in a timing corresponding to a PCM region to be described later. In a reproduction mode, the circuit 9 demodulates PCM data supplied from the recording/reproduction amplifier 10 and outputs the demodulation data through a contact P of a switch 18 to a monitor 15 side.

In the recording mode, the video and AFM circuit 13 FM modulates video signal S4 and audio signal S3 supplied from respective input terminals 16 and 17 and outputs the modulated signals to the recording/reproduction amplifier 10, while outputting video and audio signals for monitoring to a contact "b" of a switch 14 and a contact "F" of the switch 18, respectively. A rotary head 11 is mounted on a rotary drum (not shown) and traces a magnetic tape 12. As the magnetic tape 12 is traced by the rotary head 11, many obliqued tracks are formed on the tape 12. In the recording mode, the rotary head 11 records signals from the recording/reproduction amplifier 10 in obliqued tracks of the magnetic tape 12. In the reproduction mode, it outputs signal reproduced from the obliqued tracks to the recording/reproduction amplifier 10.

Figure 3:
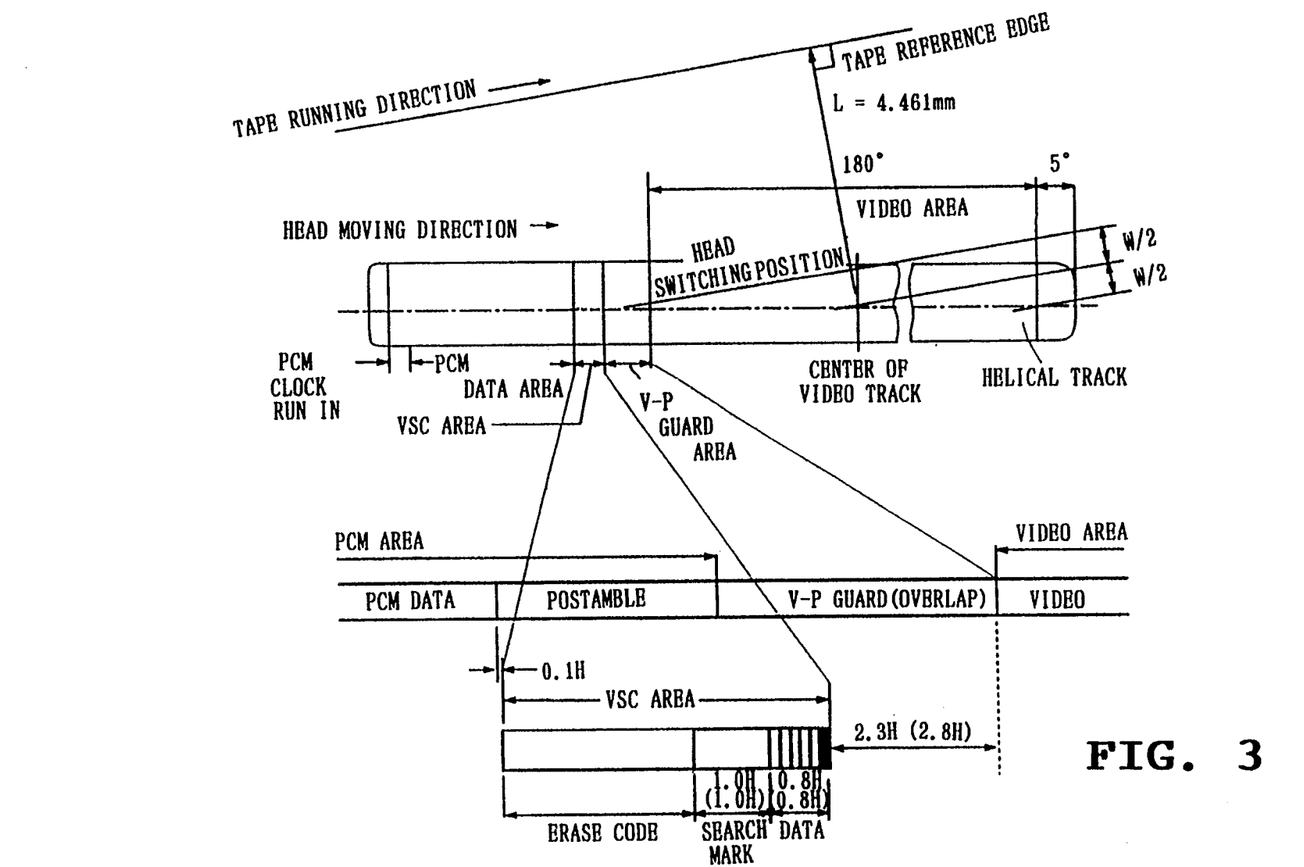
FIG. 3 is a schematic view for explaining the track format of a magnetic tape 12 shown in FIG. 1.

FIG. 3 shows the pattern of obliqued tracks formed on the magnetic tape 12. As shown, the obliqued tracks have a video region, which has a length corresponding to a winding angle of 180 degrees, and a PCM region, which is formed on the side of a V—P guard region opposite the video region. In the PCM region, a VSC region, a PCM data region and a PCM clock line region are formed in the mentioned order from the side of the V—P guard region. In the video region, FM video and FM audio signals are recorded by frequency multiplexing recording. In the PCM data region, PCM audio data is recorded. In the PCM clock line region, clock data necessary for reproducing the PCM data is recorded.

The VSC and V—P guard regions are partly shown exaggerated in FIG. 3. As shown, the VSC region is formed in portions of post-amble and V—P guard regions. The PCM data and VSC regions are spaced apart by 0.1 H. The VSC and video regions are spaced apart by 2.3 H in the case of the NTSC system and by 2.8 H in the case of the PAL system.

Figure 4:
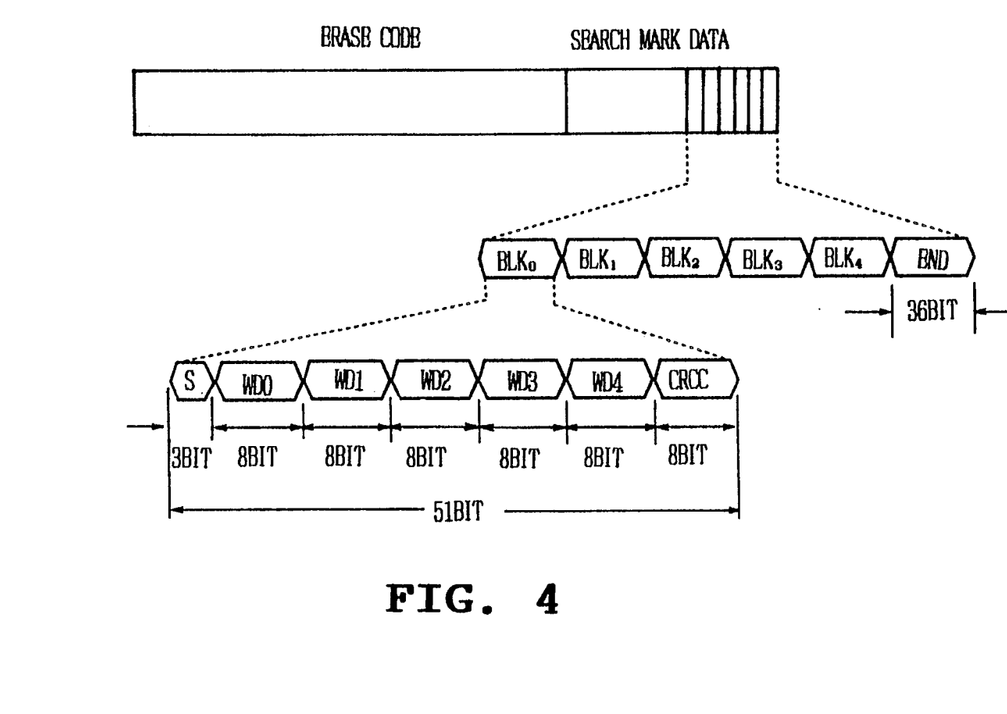
FIG. 4 is a schematic view showing, to an enlarged scale, the VSC region shown in FIG. 1.

The VSC region, as shown in FIG. 4, is divided into three regions, i.e., a region for recording erase code (for instance being all "1") to be set in order to remove a signal without erasing when after-recording VSC, a 1.0 H region for recording a search mark which is searched when in searching a head of data, and is used for deciding, for instance, as a search mark when all "0" or as a signal other than search mark when all "1", and a 0.8 H region for recording data. The data region consists of 6 blocks, i.e., 5 data blocks and an end block. The end block is constituted by 36-bit length data. In this block, an end code indicative of the last data in the VSC region is recorded. Here, the number of data blocks of the data region may be one.

Each data block is constituted by 51-bit data. The first 3 bits are allocated to a sync code S, and the following bits are allocated to 6 words each of one byte (i.e., 8 bits). In the first 5 words WD0 to WF4 WD4, predetermined data are recorded, and the last word is allocated to an end detection code.

Figure 5:
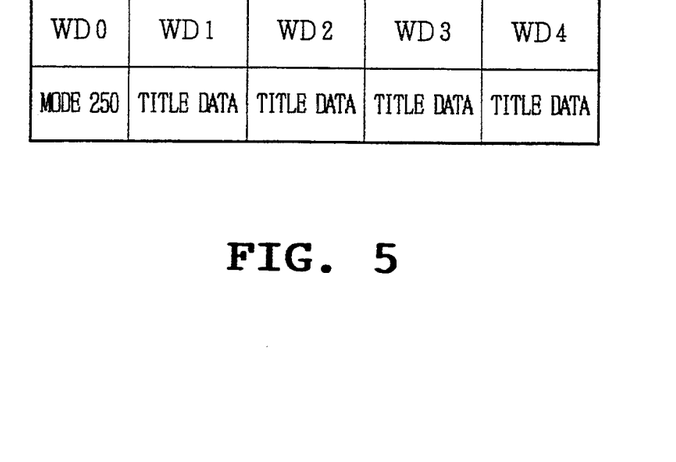
FIG. 5 is a schematic view showing the signal format in the case of recording title data in each word of the data block shown in FIG. 4.
Figure 6:
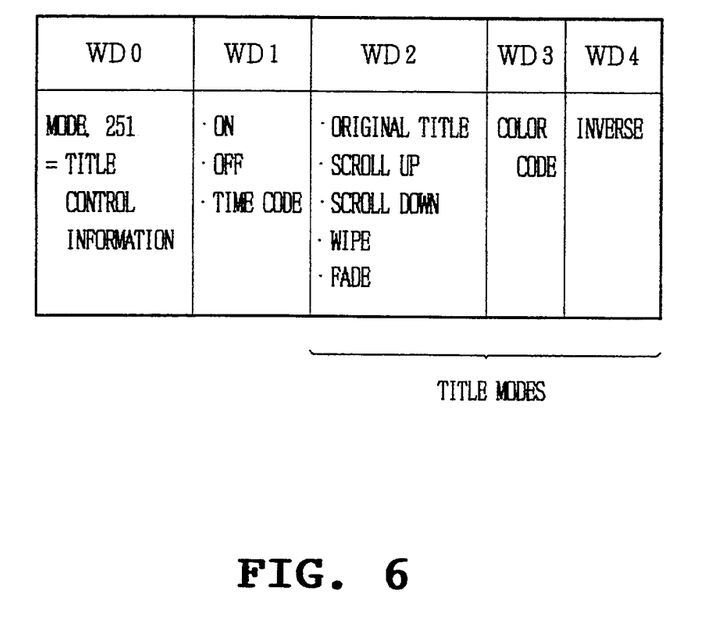
FIG. 6 is a schematic view showing the signal format in case of recording title control information in each work of the data block shown in FIG. 4.

FIGS. 5 and 6 show the contents of the data recorded in the words WD0 to WD4. FIG. 5 shows a case, in which "250" is recorded as mode No. data in the word WD0. In each of the following 4 words WD1 to WD4, a title is recorded.

FIG. 6 shows a case, in which "251" is recorded as mode No. data in the word WD0. In the following 4 words WD1 to WD4, title mode information (i.e., title control codes) is recorded. More specifically, in the word WD1 a control code for turning on or off the title display or a time code indicative of the display time is recorded. In the word WD2, an original code indicative of displaying the title without any process, scroll up and down codes indicative of upwardly and downwardly scrolling the title, a wipe code indicative of wiping of the title and a fade code indicative of causing the fading of the title, are recorded. In the word WD3, a color code is recorded. In the word WD4, an inversion code is recorded. Title modes are recorded in the words WD1 to WD4 in correspondence to the operation of the keys 7A to 7J shown in FIG. 2.

The operation will now be described. In the recording mode, video and audio signals coupled to the input terminals 16 and 17 are FM modulated in the video and AFM circuit 13, the output of which is in turn supplied to the recording/reproduction amplifier 10. The recording/reproduction amplifier 10 includes an internal switch 10A, which is adapted to be switched to a contact "b" in the video region and to a contact "a" in the other regions. Thus, in the timing of supply of the video FM and audio FM signals from the video and AFM circuit 13, the switch 10A is switched to the contact "b", and the video FM and audio FM signals are supplied from the recording/reproduction amplifier 10 to the rotary head 11 to be recorded in the video region of the magnetic tape 12.

The audio signal coupled to the input terminal 17 is also supplied to the PCM circuit 9 for PCM processing before being supplied to the contact "a" of the switch 10A. Thus, in the PCM region the switch 10A is switched to the contact "a", and the recording/reproduction amplifier 10 supplies the PCM audio data to the rotary head 11. Consequently, the PCM audio data is recorded in the PCM data region of the magnetic tape 12.

Meanwhile, the video and audio signals supplied to the video and AFM circuit 13 are also supplied to the contact "b" of the switch 14 and the contact "F" of the switch 18. At this time, the switch 14 has been switched to the contact "b", while the switch 18 has been switched to the contact "F". Thus, it is possible to monitor the video and audio signals for recording on the monitor 15.

In the reproduction mode, a signal reproduced from obliqued tracks of the magnetic tape 12 by the rotary head 11 is supplied to the recording/reproduction amplifier 10. In the recording/reproduction amplifier 10, the switch 10A is switched such that the signal reproduced from the video region of the obliqued tracks is supplied to the video and AFM circuit 13 and that signal reproduced from the other regions is supplied to the PCM and VSC circuits 9 and 8. The video and AFM circuit 13 demodulates the input video FM and audio FM signals and supplies the video signal through the contact "b" of the switch 14 to the monitor 15 while supplying the audio signal through the contact "F" of the switch 18 to the monitor 15. It is thus possible to monitor the video and audio signals reproduced from the magnetic tape 12 on the monitor 15. When a speech switch (not shown) in the operating unit 7 is operated, the microcomputer 6 switches the switch 18 to the contact "P". At the contact, a reproduced audio signal obtained through modulation in the PCM circuit 9 prevails. It is thus possible to monitor the PCM audio signal in lieu of the FM audio signal on the monitor 15.

Figures 7A, 7B:
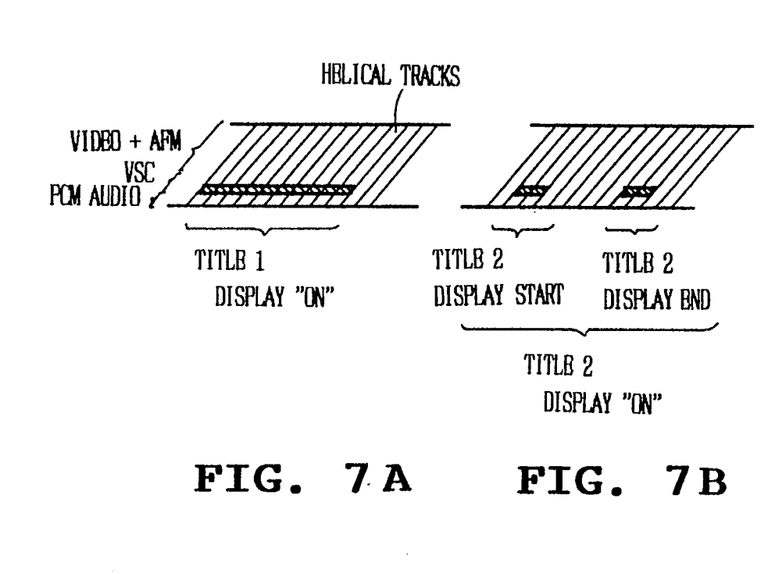
FIGS. 7A to 7C are schematic views showing three different systems for recording the VSC signal.
Figure 7C:
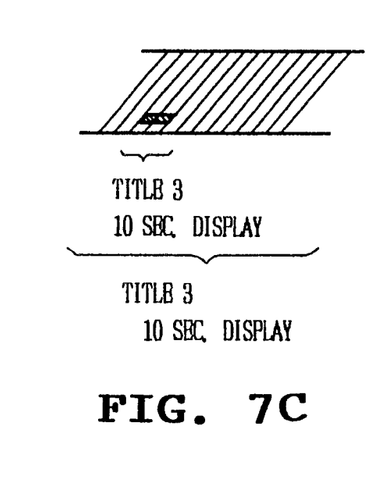

The operation will now be described in connection with the case of a recording title on the magnetic tape 12 or reproducing (i.e., displaying) the recorded data. As the system for recording a control code therefore if necessary, in the VSC region, there are three different systems as shown in FIGS. 7A to 7C. In the system shown in FIG. 7A, the VSC signal of the title control code is recorded in all of the title display fields. In the system shown in FIG. 7B, the VSC signal of the title control code is recorded at title display start and end positions.

In the system shown in FIG. 7C, the VSC signal of the title control code is recorded in the title display position (or in a preceding position). Here the VSC signal may be recorded simultaneously with when recording the video signal and the audio signal, or may be recorded in after-recording.

Figure 8:
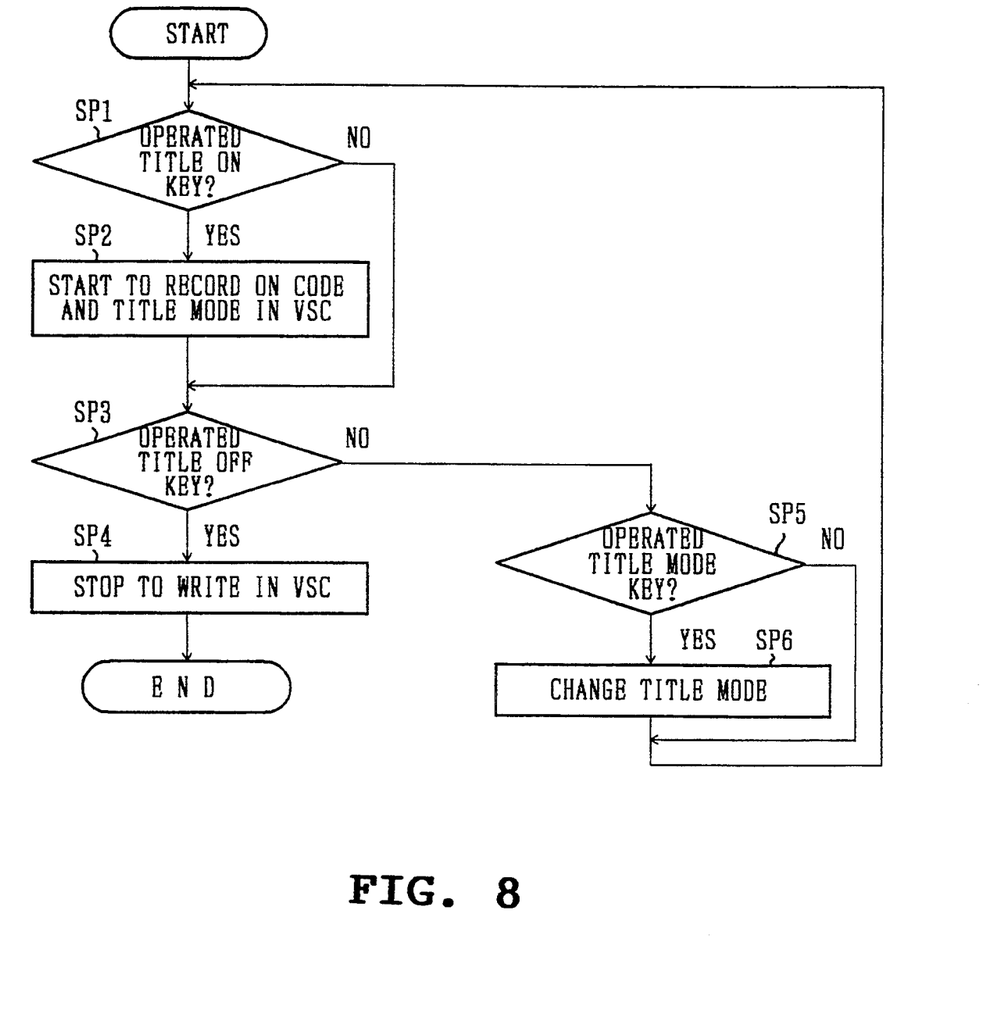
FIG. 8 is a flow chart for explaining the process of recording the VSC signal with a system shown in FIG. 7A.
Figure 9:
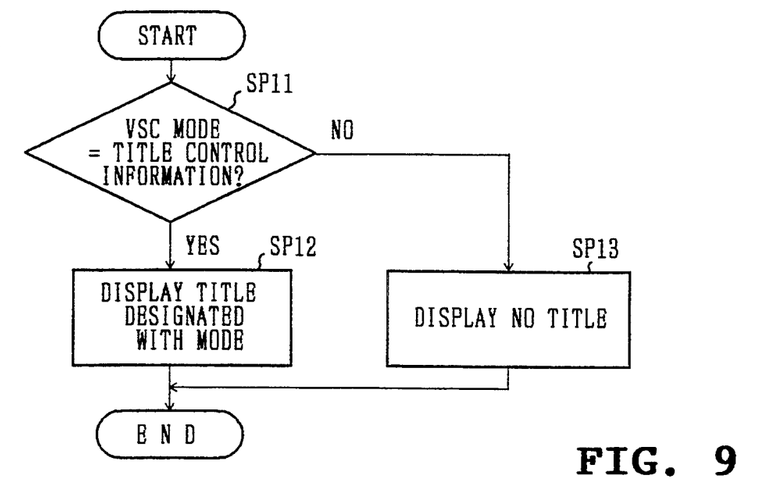
FIG. 9 is a flow chart for explaining the process of reproducing the VSC signal recorded with the system shown in FIG. 7A.

The flow charts of FIGS. 8 and 9 illustrate the operation in the case of recording or reproducing the VSC signal in the system shown in FIG. 7A.

When the VSC signal is recorded, the reproduction mode is instructed to the microcomputer 6 by operating the operating unit 7. By so doing, the video and audio signals recorded on the magnetic tape 12 are reproduced and output to the monitor 15 for display thereon, as mentioned before. The user thus may record (i.e., after-record) the VSC signal, if necessary, by operating a predetermined key in the operating unit while watching the image display.

More specifically, in a step SP1 a check is made as to whether the title "on" key 7A is operated. If the key 7A is operated, a step SP2 of recording as shown in FIGS. 5 and 6 is executed. That is, the mode No. data "251" is recorded in the word WD0, and a core for turning on the title display is recorded in the corresponding word WD1. Further, in response to the operation of the title mode keys 7C to 7I in the operating unit 7, the prevailing various title mode codes are recorded in the words WD2 to WD4.

The title memory controller 4 processes the binalized title, which is obtained from luminance signal 51 supplied to the comparator 3 from the input terminal 1. Thus, various data to be recorded in the words WD1 to WD4 shown in FIGS. 5 and 6 are stored in the memory 5.

The title memory controller 4 reads out data from the memory 5 in a predetermined timing and supplies the read-out data to the VSC circuit 8, and generates a code corresponding to control from the microcomputer 6. The VSC circuit 8 converts the input data into a recording signal, which is output to the recording/reproduction amplifier 10 in a timing corresponding to the VSC region. In consequence, the title and title mode data subordinate thereto, as shown in FIGS. 5 and 6, are recorded in the VSC region of the magnetic tape 12.

While solely title may be recorded, in the case of recording the control code together with the title, one of the 5 blocks in each field (i.e., inclined track) may be used for control code while using the other 4 blocks for title. As a further alternative, the control code may be recorded in one of the 5 blocks while recording the title in the other 4 blocks of that field and also recording the title in all 5 blocks in the other 4 fields. The title control code may be also recorded by operating the title "on" key 7A of the operating unit 7 after obtaining predetermined title data which is recorded and reproduced.

The "on" code may be also started to record from the position corresponding to when operating the title "on" key, after recording the title data on the VSC region, when the title key is operated to rewind a tape by a predetermined quantity.

The above write operation is executed continuously while the title "on" key 7A of the operating unit 7 is operated by the user.

If it is judged in step SP1 that the title "on" key 7A is not operated, the process in step SP2 is skipped. That is, neither title nor title mode data is recorded. If it is judged in SP1 that the title "on" key 7A is not operated, upon completion of the process in step SP2 a next step SP3 is executed, in which it is determined whether the title "off" key 7B is operated. If it is judged that the title "off" key 7B is operated, a step SP4 is executed, in which the operation of writing data in the VSC region is stopped.

If it is judged in step SP3 that the title "off" key 7B is not operated, a step SP5 is executed, in which it is determined whether any of the title mode keys 7C to 7C is operated. If it is judged that any key is operated, a step SP6 is executed, in which the title mode (i.e., data stored in the memory 5) corresponding to the operated key is changed and the tape is recorded via the VSC circuit. If none of the title mode keys 7C to 7I are operated, the process in step SP6 is skipped. If the process in the step SP6 is executed, or if it is judged in step SP5 that no title mode key is operated, the routine returns to step SP1 to repeat the subsequent operation.

FIG. 9 illustrates a process in the case of reproduction from a magnetic tape, in which title and control code are recorded in the VSC region. First, a check is done in a step SP11 as to whether the mode recorded in the word WD0 in the VSC signal is "251" (i.e., title control information). If the mode No. recorded in the word WD0 is "251", and the code recorded in the next word WD0 is a code for turning on the display, a step SP12 is executed, in which the title is displayed in correspondence to the title mode code designated by the words WD2 to WD4. If it is judged in step SP11 that the data in the word WD0 is not "251" (i.e., not title control information), a step SP13 of discontinuing the display is executed. This title data has been reproduced from the tape to store into the memory 5, or has been input from an external source through the title controller to store into the memory 5.

More specifically, when the VSC signal is supplied from the recording/reproduction amplifier 10, the VSC circuit 8 reads this signal and outputs the same to the title memory controller 4. The title memory controller 4 processes the read-out title data and supplies the processed data to the memory 5 for storing. Then, it controls the switching of the switch 14 in accordance with the title and title mode data reproduced. More specifically, when displaying the title, the switch 14 is switched to the contact "a", and the video signal of the title stored in the memory 5 is output to and displayed on the monitor 15 in lieu of the video signal supplied to the video and AFM circuit 13. At this time, the title memory controller 4 causes the color code title set in the title mode to be displayed on the monitor 15.

In this way, the title is displayed together with video signal on the monitor 15. The title is displayed without any process in correspondence to the title mode code noted above, or it is scrolled upward or downward or wiped or caused to fade. Further, the data is displayed in a predetermined color or as inverse display.

While in the above case the switch 14 outputted the title signal in lieu of the video signal to the monitor 1, it is also possible to construct the switch 14 with an adder to permit display of title superimposed on the original video signal.

Operation in the case when recording or reproducing the VSC control signal in the manner as shown in FIG. 7B. In this case, the VSC signal is recorded in the title display start and end positions. Therefore, unlike the case shown in FIGS. 8 and 9 (the case shown in FIG. 7A), it is impossible to change the status of the title display. In this case, therefore, it is necessary to set a predetermined title mode in advance. For this reason, the user sets a predetermined title mode by operating the title mode keys 7C to 7I before turning on the title "on" or "off" keys 7A or 7B. At this time, it is judged in steps SP21 and SP22 of FIG. 10 that the title "on" and "off" keys 7A and 7B are "off", and thus a step SP23 is executed, in which whether any of the title mode keys 7C to 7I is operated is checked. If any title mode key is operated, a step SP24 is executed, in which the corresponding title mode is set in the microcomputer 6.

Figure 10:
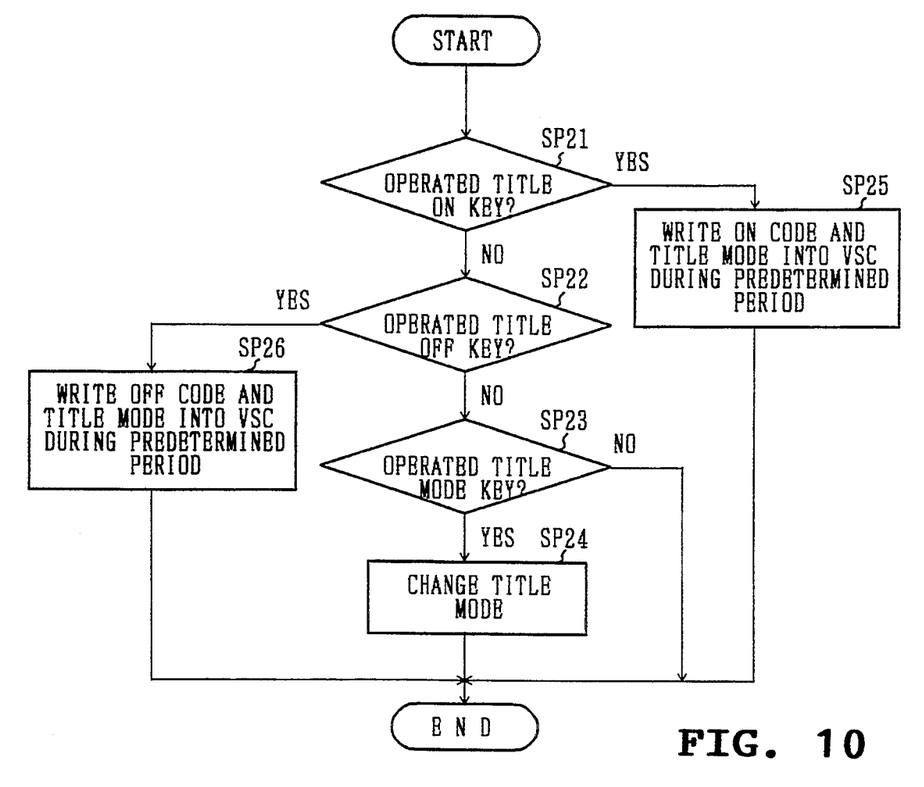
FIG. 10 is a flow chart for explaining the process in the case of recording the VSC signal with a system shown in FIG. 7B.

After the setting of the predetermined title mode in this way, reproduction of the magnetic tape 12 is made, and the user operates the title "on" key 7A at a position, at which it is desired to start the title display. At this time, step SP21 yields YES, and a step SP25 is executed, in which the mode No. "251" is held in the word WD0 for a predetermined period of time, and an "on" code indicative of the start of the display is recorded in the next word WD0. Further, title data is recorded in the words WD1 to WD4 corresponding to the word WD0, in which the mode No. "250" is stored. Here, the tape may be wound back with quantity enough to record the mode No. "250" to record on the tape.

Next, when the user operates the title "off" key 7B at a position, at which it is desired to end the title display, the step SP22 yields YES, and a step SP26 is executed, in which an "off" code is recorded in the word WD1 corresponding to the word WD0, in which the mode No. "251" is held. Again this recording is provided for a predetermined period of time.

Figure 11:
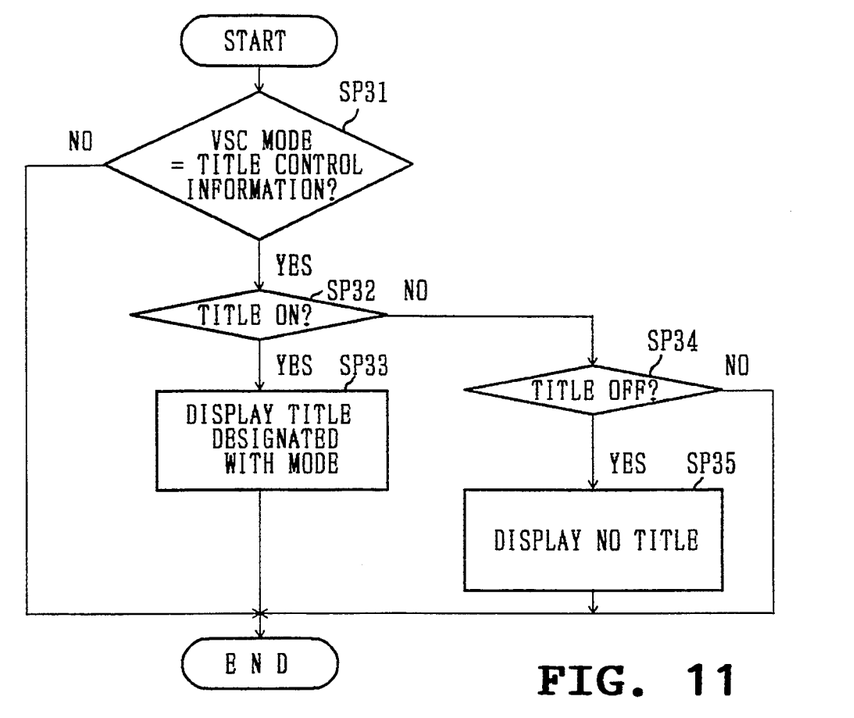
FIG. 11 is a flow chart for explaining the process in the case of reproducing the VSC signal recorded with the system shown in FIG. 7B.

When the VSC signal is recorded in the manner as shown in FIG. 10, a reproduction process as shown in FIG. 11 is executed. More specifically, in a step SP31 a check is made as to whether the mode No. in the word WD0 in the VSC signal is "251" (i.e., whether title control information is recorded). If it is judged that the title control information is recorded, a step SP23 is executed, in which whether the "on" code is stored in the word WD1 is checked. If it is judged that the "on" code is recorded, a step SP33 is executed, in which the title recorded in memory 5 is displayed in the title mode recorded in the words WD2 to WD4.

If it is judged in step SP32 that the code in the word WF1 is not the "on" code, a step SP34 is executed, in which whether the code is the "off" code is checked. If the code is judged to be the "off" code, a step SP35 is executed, in which the title display is discontinued.

In the above way, a predetermined title is displayed in a predetermined title mode from the position at which the title display start is instructed to the position, at which the title display end is instructed.

Figure 12:
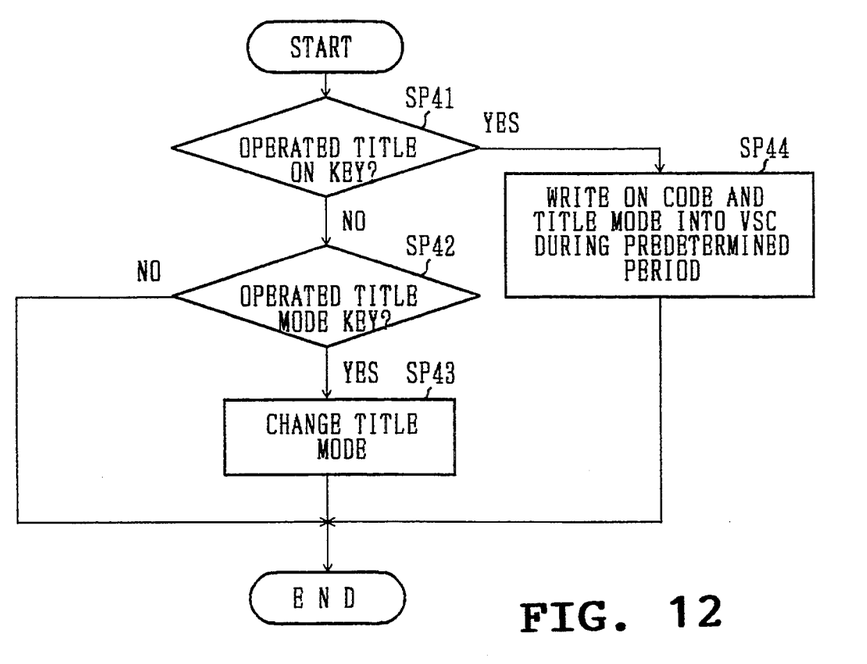
FIG. 12 is a flow chart for explaining the process in the case of recording the VSC signal with a system shown in FIG. 7C.

Now, operation in the case of displaying the title only for a predetermined period of time as shown in FIG. 7C will be described with reference to the flow charts of FIGS. 12 and 13. In this case, like the case shown in FIG. 7B, the title display status can not be changed during the operation. Therefore, again in this case it is necessary to set a predetermined title mode in advance. The user thus sets a predetermined title mode in the microcomputer 6 by operating a pertinent one of the title mode keys 7C to 7I before operating the title "on" key 7A.

At this time, it is judged in a step SP41 that the title "on" key 7A is not operated, and a step SP42 is executed, in which whether any of the title mode keys 7C to 7I are operated is checked. Since the title mode keys are operated, a step 43 is executed, in which the title modes corresponding to the operated title mode keys are stored in the microcomputer 6. When the user operates the title "on" key 7A at a position, at which it is desired to start the title display, after completion of the title mode setting operation, the step SP41 yields YES, and a step SP44 is executed. When the tape is, for example, wound back by a certain distance to come to the tape position on which the title data is recorded and the title "on" key is operated, the "on" code is recorded in the word WD1 corresponding to the mode No. "251". At this time, a time code indicative of the time, during which it is desired to continue the display, is also recorded. This time is set by operating the time key 7J in the operating unit 7. Further, various title modes are recorded in the words WD2 to WD4 corresponding to the mode No. "251".

Figure 13:
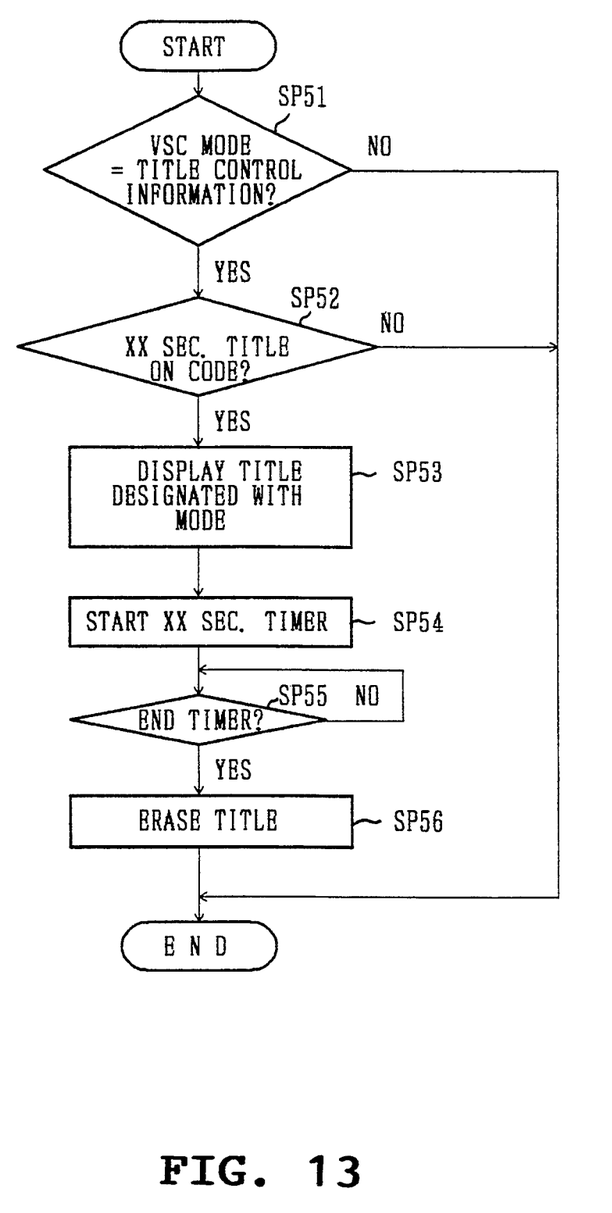
FIG. 13 is a flow chart for explaining the process of reproducing the VSC signal recorded with the system shown in FIG. 7C.

Reproduction, in case when the VSC signal is recorded in the above way, is carried out as shown in FIG. 13. In a step SP51, a check is made from the VSC signal as to whether title control information is recorded. That is, whether the mode No. "251" is stored as the word WD0 is checked. If it is judged that the title control information is recorded, a step SP52 is executed, in which whether" "on code and time code are recorded in the word WD1 corresponding to the mode No. "251" is checked. If it is judged that these codes are recorded, a step SP53 is executed, in which a display corresponding to the title modes recorded in the words WD2 to WD4 are made. Then in a step SP54, a timer corresponding to the time code recorded in the word WD1 is started. If it is judged in step SP55 that a preset time of the timer has passed, a step SP56 ending the title display started in step SP53 is executed. In this case, the title display is made for a constant period of time which is recorded in advance.

As shown in FIG. 4, in the VSC region data of 5 blocks in one field (or one track) is present. Since data of 4 bytes can be recorded in each block, it is possible to record data of 20 bytes (i.e., 5 times 4 bytes) in one field. Thus, title data of 8 K bytes, for instance, can be recorded in a time interval of about 6.6 seconds (i.e., 8,000 divided by 20 divided by 60).

In the above description, the VSC signal is recorded in continuous fields (or tracks). However, it is possible to record the VSC signal intermittently for every predetermined number of fields.

Further, by permitting the video signal of title to be recorded by compression, the recording time can be further reduced.

Further, while in the above embodiment the VSC signal reproduced from the magnetic tape 12 is once stored in the RAM as the memory 5, it is possible to use a ROM as the memory 5 for storing predetermined title data in advance and displaying a predetermined title, which is selected by operating the operating unit 7, in a predetermined title mode.

While there has been described in connection with the preferred embodiments of the invention, it will be obvious to those skilled in the art that various changes and modifications may be made, therefore, to cover in the appended claims all such changes and modifications as fall within the true spirit and scope of the invention.

What is claimed is:

1. A magnetic recording and reproducing apparatus for recording and reproducing title data with video and audio data on oblique tracks on a recording medium, comprising:

means for recording video and audio data in video and audio regions, respectively, of oblique tracks on said recording medium while leaving vacant predetermined title regions in said oblique tracks in which said video and audio data are recorded, each of said title regions including a search region for storing a respective search code;

means for recording title data having title and title control information in said title regions of the respective oblique tracks;

means for locating an oblique track having said respective search code;

means for reproducing said title, video and audio data from said respective oblique tracks on said recording medium; and means for combining said title information with said video data in accordance with said title control information to produce a video output signal.

2. The magnetic recording and reproducing apparatus of claim 14, wherein each of said title regions is located between said audio and video regions of the respective oblique tracks.

3. The magnetic recording and reproducing apparatus of claim 1, wherein each of said title regions includes an erase code region for storing a predetermined erase code, said means for recording title data is operable to after-record said predetermined erase code in said erase code region of each of said title regions, and said means for combining produces said video output signal only from said video data when said erase code region of a reproduced track contains said predetermined erase code.

4. The magnetic recording and reproducing apparatus of claim 1, wherein said means for recording title data records said title data on oblique tracks already containing audio and video data stored thereon.

5. The magnetic recording and reproducing apparatus of claim 1, further comprising storage means for storing said title data and wherein said means for combining combines said title data stored in said storage means with said video data to produce said video output signal.

6. The magnetic recording and reproducing apparatus of claim 5, wherein said storage means is a random access memory.

7. A magnetic recording and reproducing apparatus for recording title data on oblique tracks on a recording medium already having video and audio data recorded on said oblique tracks in video and audio regions, respectively, with predetermined title regions being left vacant in said oblique tracks, comprising:
  means for reproducing said video data from respective video regions of said oblique tracks;
  means for identifying those oblique tracks corresponding to said video data on which title information is to be superimposed;
  means for recording said title information in respective vacant title regions of the identified oblique tracks, said respective title regions being separate from said video and audio regions of the respective oblique tracks and including search regions for storing a respective search code; and
  means for locating an oblique track having said respective search code.

8. The magnetic recording and reproducing apparatus of claim 7, wherein each of said title regions is located between said respective video and audio regions of the respective oblique track.

9. A method of recording and reproducing title data with video and audio data on oblique tracks on a recording medium, comprising the steps of:
  recording video and audio data in respective video and audio regions of respective tracks on said recording medium while leaving vacant predetermined title regions in said respective tracks, each of said title regions including a search region for storing a respective search code;
  recording title data having title and title control information in said title regions of said respective tracks;
  reproducing said title, video and audio data from said respective tracks on said recording medium; and
  combining said title information with said video data in accordance with said title control information to produce a video output signal.

10. The method of claim 9, wherein each of said title regions is located between said respective audio-and video regions of the respective oblique track.

11. The method of claim 9, wherein each of said title regions includes an erase code region for storing a predetermined erase code, the step of recording title data includes after-recording said predetermined erase code in said erase code region of each of said title regions, and the step of combining produces said video output signal only from said video data when said erase code region of a reproduced track contains said predetermined erase code.

12. The method of claim 9, wherein the step of recording title data records said title data on oblique tracks already having audio and video data recorded in the respective audio and video regions.

13. The method of claim 9, further comprising the step of storing said title data in a random access memory, and wherein the step of combining combines said title data stored in said random access memory with said video data to produce said video output signal.

14. A method of recording title data on oblique tracks on a recording medium already having video and audio data recorded on said oblique tracks in video and audio regions, respectively, with predetermined title regions being left vacant in said oblique tracks, comprising the steps of:
  reproducing said video data from the respective video regions of said tracks;
  identifying said oblique tracks corresponding to said video data on which title information is to be superimposed;
  recording said title information in respective vacant title regions of the identified oblique tracks, said respective title regions being separate from said video and audio regions of the respective oblique tracks and including search regions for storing a respective search code; and
  locating an oblique track having said search code recorded in the search region of the respective title region.

15. The method of claim 14, wherein said title regions are located between the video and audio regions of the respective oblique tracks.

* * * * *